United States Patent

Kehal

[11] Patent Number: 6,043,304
[45] Date of Patent: Mar. 28, 2000

[54] FLAME-RETARDED ADHESIVE COMPOSITION

[75] Inventor: Narinder Kehal, Swindon, United Kingdom

[73] Assignee: Raychem Limited, Swindon Wiltsire, United Kingdom

[21] Appl. No.: 09/051,973

[22] PCT Filed: Nov. 8, 1996

[86] PCT No.: PCT/GB96/02735

§ 371 Date: Apr. 23, 1998

§ 102(e) Date: Apr. 23, 1998

[87] PCT Pub. No.: WO97/17410

PCT Pub. Date: May 15, 1997

[30] Foreign Application Priority Data

Nov. 9, 1995 [GB] United Kingdom ............ 9523002

[51] Int. Cl.⁷ ............ C09J 123/08; C08K 3/38; C08K 5/00
[52] U.S. Cl. ............ 524/115; 524/121; 524/123; 524/127; 524/186; 524/195; 524/214; 524/216; 524/413; 156/155
[58] Field of Search ............ 526/318.4, 318.45, 526/348; 524/115, 121, 123, 124, 127, 186, 195, 214, 216, 413; 156/155

[56] References Cited

U.S. PATENT DOCUMENTS

| | | |
|---|---|---|
| 4,284,542 | 8/1981 | Boyce et al. . |
| 4,426,549 | 1/1984 | Natwig ............ 524/405 |
| 4,440,888 | 4/1984 | Cook et al. ............ 524/139 |
| 5,041,490 | 8/1991 | Sakon et al. ............ 524/414 |
| 5,346,539 | 9/1994 | Hosoi et al. ............ 106/18.12 |
| 5,409,976 | 4/1995 | Lindsay ............ 524/100 |
| 5,456,539 | 10/1995 | Wright et al. ............ 400/82 |
| 5,498,476 | 3/1996 | Tucker et al. ............ 524/140 |

FOREIGN PATENT DOCUMENTS

| | | |
|---|---|---|
| 0352729 | 7/1989 | European Pat. Off. . |
| 0653458 | 11/1994 | European Pat. Off. . |
| 2289680 | 11/1995 | United Kingdom . |

OTHER PUBLICATIONS

WPI Abstract Accession No. 78–07051 (Abstract of Japanese Patent No. 52–146446) (Denki Onyko) (1978).
WPI Abstract Accession No. 77–37294 (Abstract of Japanese Patent No. 52–047 831) (Toyo Spinning) (1978).
Japanese Patent Abstract No. 7 126 451 (May 1995).
Japanese Patent Abstract No. 54 083939 (Jul. 1979).

*Primary Examiner*—Nathan M. Nutter
*Attorney, Agent, or Firm*—Sheri M. Novack

[57] ABSTRACT

A hot-melt adhesive composition based on ethylene/vinyl acetate copolymer comprising not more than 35% (preferably not more than 30%, more preferably not more than 25%) by weight, based on the whole composition, of halogen-free char-forming flame-retardant additive(s) in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, preferably V-0. Preferred halogen-free flame-retardant additives include ammonium phosphates, melamine cyanurate, zinc borate, and especially red phosphorus.

21 Claims, No Drawings

FLAME-RETARDED ADHESIVE COMPOSITION

CONTINUING DATA

This application is a continuation filed under 25USC 371 of PCT/6B 96/02735 filed Nov. 8, 1996.

This invention relates to a flame-retarded hot-melt adhesive composition, which may be applicable to dimensionally heat-recoverable articles to flow and seal when the articles are heat-recovered in use.

Hot-melt adhesives based on non-flame-retarded ethylene/vinyl acetate (EVA) copolymer or polyamide (PAm) are well known in the heat-shrink field and other fields. Adhesives flame-retarded with halogenated organic additives for use on the inner surface of a heat-shrinkable tube are described in U.S. Pat. No. 5,346,539. The present invention improves on this by providing more environmentally-acceptable compositions flame-retarded with halogen-free additives, which can nevertheless pass stringent flammability test requirements at unexpectedly low additive levels, while surprisingly maintaining desirable heat softening and flow characteristics.

The invention accordingly provides a hot-melt adhesive composition based on ethylene/vinyl acetate copolymer (EVA) comprising not more than 35% (preferably not more than 30%, more preferably not more than 25%) by weight, based on the whole composition, of halogen-free char-forming (preferably phosphorus-containing) flame-retardant additive(s) in an amount at least sufficient to prevent flaming drips generated on burning of a strip of the adhesive from igniting the underlying absorbent cotton according to the 20 mm Vertical Burn Test of Underwriters Laboratories Test Method UL-94 (1993), V-1, preferably V-0.

It has been found according to the present invention that the EVA hot melts can be adequately flame retarded with halogen-free additives, preferably in the absence of further flame retardants or thixotropy-increasing fillers, which additives surprisingly do not achieve the same desirable effect at similar additive levels in polyamide-based hot melts. The polyamides moreover tend to be more expensive than the EVAs. It has also unexpectedly been found that a relatively high Melt Flow Index (MFI) assists the EVA adhesives in passing the above UL94 requirements.

The specified (preferably phosphorus-containing) additives are halogen-free, and it is preferred that the whole adhesive or mastic composition is substantially entirely halogen-free, except for possible negligible amounts of halogenated impurities. The compositions according to this invention are preferably substantially free of finely-divided silica, talc, or alumina fillers, and substantially free of all finely-divided thixotropy-increasing fillers.

In one preferred composition of the invention, the flame-retardant additive comprises ammonium phosphate, preferably ammonium polyphosphate; or an organic amine phosphate, preferably ethylene diamine phosphate. This composition preferably comprises at least 20%, preferably 25 to 35%, more preferably 25 to 30%, by weight of the ammonium phosphate or organic amine phosphate, preferably in the absence of other flame-retardant additives.

In another preferred embodiment of the invention, the composition comprises a synergist for the aforementioned ammonium polyphosphate, preferably poly{[6-(4-morpholinyl)-1,3,5-triazine-2,4-diyl]-1,4-piperazinediyl} $(C_{11}H_{16}N_6O)_n$. In this case, the composition preferably comprises at least 15%, preferably 15 to 30%, more preferably 15 to 20%, by weight of the combined ammonium phosphate and synergist, preferably in the absence of other flame-retardant additives.

In an especially-preferred embodiment of the invention, the flame-retardant additive comprises red phosphorus. Preferably, the composition comprises at least 1%, preferably at least 1.25%, more preferably at least 1.5%, by weight of the red phosphorus, preferably in the absence of other flame-retardant additives. It is also preferred that the composition comprises not more than 10%, preferably not more than 5%, more preferably not more than 3%, by weight of the red phosphorus. The red phosphorus will preferably be master-batched at about 50% by weight in a carrier polymer compatible with, preferably of the same or similar chemical type or more preferably the same polymer as, the base polymer of the composition, and this master batch will then be used to provide appropriate levels of the red phosphorus in the final composition.

As inventive alternatives to the phosphorus-containing additives, the flame-retardant additive may for example comprise zinc borate or melamine cyanurate. The invention may thus include (a) a hot melt adhesive composition comprising at least 10%, preferably 10 to 25%, more preferably 10 to 20%, especially preferably 10 to 15%, by weight of the whole composition, of melamine cyanurate as a flame-retardant additive, preferably in the absence of other flame-retardant additives; or (b) a hot melt adhesive composition comprising at least 10%, preferably 10 to 25%, more preferably 15 to 20%, by weight of the whole composition, of zinc borate as a flame-retardant additive, preferably in the absence of other flame-retardant additives. Compositions within these ranges, which are also preferably halogen-free, have also been found capable of passing the aforementioned "flaming drip" test requirements at the highest level of performance, V-0, according to UL94, while retaining desirable flow characteristics for application to and use with the aforementioned heat-recoverable articles.

It was unexpected that such relatively low quantities of the halogen-free flame-retardant additives could enable the compositions to meet the "flaming drip" requirements of the aforementioned standard, and such low additive ratios are highly advantageous in retaining desirable flow and viscosity characteristics for application to and use with heat-recoverable articles. As a result, the composition according to this invention may be carried on a dimensionally heat-recoverable article, the amount of the flame-retardant additive(s) being less than that which prevents the composition from softening and/or flowing to effect sealing under conditions to which it is subjected during normal heat recovery of the said article in use. Heat-recoverable (especially heat-shrinkable) articles, for example tubes, "boots", "udders", wrap-around sheets and mouldings, are sufficiently well-known to require no further description herein. Depending on the polymeric material from which they are made, such articles are usually recovered (shrunk) at external surface temperatures from about 120° C. (polyolefins) to 190° C. (polyvinylidenefluoride). An adhesive composition carried on the inner surface of such articles tends to experience temperatures at least 20° C. lower than the exterior surface during normal heat-recovery in use.

The adhesive-grade EVA's used for the present invention will preferably comprise at least 16%, more preferably at least 20%, especially preferably at least 25%, by weight of vinyl acetate. The EVA's will preferably have a Melt Flow Index (hereinafter MFI), expressed in g/10 minutes at 190° C. using a 2.16 kg weight according to ASTM D138 (1979) of at least 100, especially preferably at least 500. The flame-retarded EVA hot melt adhesive compositions according to the invention will preferably have MFI as above of at least 50, preferably at least 100, more preferably at least 200, especially at least 300.

Examples of compositions according to this invention will now be described in more detail.

HOT MELT ADHESIVE EXAMPLES

Hot melt adhesive compositions were made up as follows, all proportions being by weight based on the whole composition. The flame-retardant additives were mixed with each of the following copolymers (commercially available from du Pont under the "Elvax" trade mark) alone: Elvax 4310 ethylene/vinyl acetate terpolymer of MFI 550, vinyl acetate content (VA) 28%, containing 1–2% methacrylic acid; Elvax 410 EVA (VA 18%, MFI 500), Elvax 46 EVA (VA 46%, MFI 100). A further polymer composition (E+N) was made by blending Elvax 4310 with 2% of anti-rad material comprising 1,1-thiobis-2-naphthol and 5% of a known tackifier resin available under the Trade Mark Nevpene 9500 in a small Henschel mixer followed by compounding in a ZSK twin-screw extruder from which pellets of the final polymer composition were obtained in known manner. The flame retardants were then added in the proportions indicated in the following Table I by milling each of these polymer materials at room temperature on a twin-roll mill to produce sheets of the final flame-retarded compositions, followed by compression moulding of plaques from which strips were cut for testing according to the UL94 test.

Further examples were similarly prepared using a polyamide hot melt adhesive (PAm) of the kind described in EP-B-40926 (B053), the disclosure of which is incorporated herein by reference, which contains added ethylene/acrylic acid terpolymer. The results of the UL94 flaming drip tests are indicated in the Table as Pass (P) at V-0 level, or Fail (Fl) against the various percentage proportions by weight of the specified flame-retardant additives.

TABLE I

| Ex. | ADDtve | Elvax 4310 | | | | E410 | E46 | E + N | PAm |
|---|---|---|---|---|---|---|---|---|---|
| 1 | AmMC | 25/P | 20/P | 15/Fl | 10/Fl | 20/P | 20/P | 25/P | 30/Fl |
| 2 | Spinfl | 25/P | 20/P | 15/P | 10/Fl | — | — | 20/P | — |
| 3 | AmNL | 25/P | 20/P | 15/Fl | 10/Fl | — | — | — | — |
| 4 | ZnBort | 25/P | 20/P | 15/P | 10/Fl | 10/P | 20/Fl | 15/P | 20/Fl |
| 5 | Mel.cy | 25/P | 20/P | 15/P | 10/P | 10/P | 15/P | 10/P | 15/Fl |
| 6 | Novams | 9/P | 6/P | 2.4/P | 1.2/Fl | — | — | — | — |
| 7 | AmRYC | 10/P | 5/P | 2.5/P | 1.2/P | 5/P | 5/P | 1/P | 10/P |

The Additives (ADDtve) were as follows, trade marks being indicated "TM":
AmMC: Amgard MC (TM) Ammonium polyphosphate from Albright & Wilson.
Spinfl: Spinflam MF82/PE (TM) Ammonium polyphosphate + aforesaid synergist.
AmNL: Amgard NL (TM) Ethylene diamine phosphate.
ZnBort: Zinc Borate.
Mel.cy: Melamine cyanurate.
Novams: Novomasse (TM) Red phosphorus 60% masterbatch in phenolic resin.
AmRYC: Red phosphorus 50% masterbatch in Elvax 4310 (TM) EVA.

The Additives (ADDtve) were as follows, trade marks being indicated "TM":
AmMC: Amgard MC (TM) Ammonium polyphosphate from Albright & Wilson.
Spinfl: Spinflam MF82/PE (TM) Ammonium polyphosphate+aforesaid synergist.
AmNL: Amgard NL (TM) Ethylene diamine phosphate.
ZnBort: Zinc Borate.
Mel.cy: Melamine cyanurate.
Novams: Novomasse (TM) Red phosphorus 60% masterbatch in phenolic resin.
AmRYC: Red phosphorus 50% masterbatch in Elvax 4310 (TM) EVA.

I claim:

1. A hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg. weight according to ASTM D138 (1979), the adhesive composition comprising not more than 35% by weight, based on the whole composition, of halogen-free char-forming flame-retardant additive(s) in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes, and wherein the flame-retardant additive is phosphorous-containing and comprises one of (a) ammonium phosphate, and (b) an organic amine phosphate.

2. A composition according to claim 1, which is substantially entirely halogen-free.

3. A composition according to claim 1, which is substantially free of finely-divided silica or alumina fillers.

4. A composition according to claim 1 having a Melt Flow Index, eexpressed in g/10 minutes, measured according to ASTM D138 (1979) at 190° C. using a 2.16 kg weight, of at least 50.

5. A composition according to claim 1, wherein the base polymer has a Melt Flow Index, expressed in g/10 minutes. measured according to ASTM D138 (1979) at 190° C. using a 2.16 kg weight, of at least 100.

6. A composition according to claim 1, comprising at least 20% by weight of the ammonium phosphate (a) or the organic amine phosphate(b).

7. A composition according to claim 1, comprising a synergist for the ammonium phosphate (a).

8. A composition according to claim 7, comprising at least 15% by weight of the combined ammonium phosphate and synergist.

9. A composition according to claim 1 wherein the flame-retardant additive comprises red phosphorus.

10. A hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg.

weight according to ASTM D138 (1979), the adhesive composition comprising not more than 35% by weight, based on the whole composition, of halogen-free char-forming flame-retardant additive(s) in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes, wherein said flame-retardant additive comprises at least 1% by weight of red phosphorus.

11. A composition according to claim 10, comprising not more than 10% by weight of the red phosphorus.

12. A hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg. weight according to ASTM D138 (1979), the adhesive composition comprising not more than 35% by weight, based on the whole composition, of halogen-free char-forming flame-retardant additive(s) comprising melamine cyanurate in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes.

13. A composition according to claim 12, comprising at least 10% by weight of the melamine cyanurate.

14. A hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg. weight according to ASTM D138 (1979), the adhesive composition comprising not more than 35% by weight, based on the whole composition, of halogen-free char-forming flame-retardant additive(s) comprising zinc borate in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes.

15. A composition according to claim 14, comprising at least 10% by weight of the zinc borate.

16. A composition according to claim 1, which is a hot melt adhesive based on ethylene/vinyl acetate copolymer, which copolymer comprises at least 20%, by weight of the vinyl acetate.

17. A composition according to claim 1 carried on a dimensionally heat-recoverable article, the amount of flame-retardant additive(s) being less than that which prevents the composition from softening and/or flowing to effect sealing under conditions to which it is subjected during normal heat recovery of the said article in use.

18. A wire having a composition according to claim 17 in contact therewith and having the said heat-recoverable article heat recovered around it.

19. A cable joint having a composition carried on a dimensionally heat-recoverable article and comprising a hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg. weight according to ASTM D138 (1979), the adhesive composition comprising not more than 35% by weight, based on the whole composition, of halogen-free char-forming flame-retardant additive(s) in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes and being less than that which prevents the composition from softening and/or flowing to effect sealing under conditions to which it is subjected during normal heat recovery of the said article in use, said cable joint being in contact with said composition and having the said heat-recoverable article heat recovered around it.

20. A harness having a composition carried on a dimensionally heat-recoverable article and comprising a hot-melt adhesive composition based on ethylene/vinyl acetate copolymer, which copolymer has (a) at least 16% by weight vinyl acetate content and (b) a Melt Flow Index of at least 100 g/10 minutes at 190° C. using a 2.16 kg. weight according to ASTM D138 (1979), the adhesive composition comprising not more than 35% by weight, based on the whole composition, of halogen-free char-forming flame-retardant additive(s) in an amount at least sufficient to prevent flaming drips generated on burning of the adhesive from igniting the underlying absorbent cotton according to the 20 mm Vertical Burn Test of Underwriters Laboratories Test Method UL-94 (1993), V-1, while leaving the adhesive composition with a Melt Flow Index (tested as above) of at least 50 g/10 minutes and being less than that which prevents the composition from softening and/or flowing to effect sealing under conditions to which it is subjected during normal heat recovery of the said article in use, said harness being in contact with said composition and having the said heat-recoverable article heat recovered around it.

21. A composition according to claim 1 wherein there is only one flame-retardant additive present.

\* \* \* \* \*